United States Patent Office 2,809,945
Patented Oct. 15, 1957

2,809,945

POLYVINYL ACETATE EMULSIONS STABILIZED WITH HYDROXYETHYL CELLULOSE AND METHOD OF PREPARATION

Edward Harvey Wright and George Campbell Pickard, Shawinigan Falls, Quebec, Canada, assignors to Shawinigan Chemicals Limited, Montreal, Quebec, Canada, a corporation of Canada No Drawing. Application June 13, 1955,
Serial No. 515,247

9 Claims. (Cl. 260—17)

This invention relates to polyvinyl acetate emulsions, and particularly to those emulsions, containing hydroxyethyl cellulose as the principal stabilizer, which can be applied in the form of a film, coating, layer, or the like, and dried to a substantially water-resistant structure.

It has previously been disclosed that polyvinyl acetate aqueous emulsions containing polyvinyl alcohol as stabilizer can be modified by the addition of glyoxal to form a film which, on drying, is substantially water insensitive, whereas the unmodified emulsions form films which are objectionably water sensitive, due to the continued presence of the polyvinyl alcohol stabilizer in the dried film. The polyvinyl alcohol in the dried structure tends to redisperse the polyvinyl acetate when the dry film is moistened with water.

Similarly it is found that polyvinyl acetate aqueous emulsions containing hydroxyethyl cellulose as the principal stabilizer form films which, when dried, are objectionably water sensitive and tend to redisperse when moistened with water. In contrast, however, when these polyvinyl acetate aqueous emulsions containing hydroxyethyl cellulose as the principal stabilizer are modified by the foregoing expedient of simple addition of glyoxal, the films, coatings, etc. formed by drying the emulsions are not rendered water-insensitive by the addition of glyoxal to the emulsion.

It is an object of this invention to provide aqueous polyvinyl acetate emulsions, containing hydroxy ethyl cellulose as the principal stabilizer, which will form films and coatings which on drying have highly improved water resistance.

The object of this invention can be accomplished by adding .3–3% glyoxal, based on the weight of the polyvinyl acetate, to an aqueous polyvinyl acetate emulsion containing hydroxyethyl cellulose as the principal stabilizer while the emulsion is at an elevated polymerization temperature above about 40° C.; obviously the elevated temperature cannot be at or above the temperature at which the emulsion coagulates or is destabilized. It has been found that by incorporating .3–3% glyoxal, by weight of the polyvinyl acetate, into an aqueous polyvinyl acetate emulsion containing hydroxyethyl cellulose as the principal stabilizer while the emulsion is at an elevated temperature above about 40° C., preferably between about 45° C. and 60° C., the emulsion forms films and coatings which on drying have highly improved water resistance. This unexpected result contrasts sharply with the fact that water-insensitive films are not obtained if glyoxal is incorporated into the emulsions while they are at temperatures below about 40° C. It has been further found that the beneficial effects of the invention can be enhanced by lowering the pH of the treated emulsions to a value not lower than 2, preferably between 2.5 and 3.5, using acetic acid to increase the acidity. The pH of polyvinyl acetate emulsions immediately after preparation is usually in the range around 4.5–5.5, and hydrolysis of any residual monomeric vinyl acetate to acetic acid reduces the pH slightly. However, deliberate addition of more acetic acid to achieve the foregoing desirable pH range of 2.5–3.5 is a surprising and effective method for enhancing the water resisting properties of polyvinyl acetate films cast from emulsion made by the process of this invention.

For purposes of this invention, it is not significant whether the glyoxal is incorporated into emulsion while it is still at an elevated temperature used during preparation or manufacture thereof and above about 40° C. immediately after preparation or manufacture, or whether the glyoxal is incorporated into emulsion heated to an elevated temperature above about 40° C. some time after it has cooled to normal room temperature from the elevated temperature used during manufacture.

The following examples will serve to illustrate the invention.

*Example 1*

An aqueous emulsion of polyvinyl acetate was prepared as follows:

To 5,617 ccs. of water in a jacketed polymerization kettle stirred at 1190 R. P. M. were added 2,480 grams of "Cellosize WLSM" (a 10% solution of hydroxyethyl cellulose) as stabilizer, 2.7 grams "Antifoam DC" (a silicone compound antifoaming agent sold commercially by Dow Corning Silicones Ltd.) and 21.2 grams "Santomerse D" (a neutral powdered substituted aromatic sulfonic acid wetting agent-emulsifier sold commercially by Monsanto Chemical Co.). When the mixture had been heated to 50° C., 1,065 ccs. of vinyl acetate were added over a period of 12 minutes, while heating was continued. Then a mixture of 25.5 grams of potassium persulfate and 2.0 grams of sodium sulfite was added to start polymerization. When the temperature reached 80° C. the gradual addition of another 10,907 ccs. of vinyl acetate to the kettle was started, along with the addition of 15.5 grams of sodium bicarbonate in 820 ccs. of water as reaction modifier. The gradual additions were completed over a period of 95 minutes while the temperature was held at about 80° C. A final portion of 5.4 grams of potassium persulfate was added, and the reaction temperature was raised and held at 90° C. for 10 minutes to complete the polymerization, then the completed aqueous polyvinyl acetate emulsion was allowed to cool to 45° C.

When the emulsion had cooled to 45° C. a sample of 3,606 grams thereof was withdrawn and placed in a container in a pail of water at 45° C. and allowed to cool to room temperature at the same rate that the remainder of the emulsion cooled to room temperature. To the remaining 16,319 grams of emulsion still at 45° C. were added 326 grams of aqueous glyoxal solution containing about 30% by weight glyoxal. The emulsion was then allowed to cool to room temperature with stirring.

A simple spot test illustrates the difference in water sensitivity between the unmodified emulsion and the emulsion containing glyoxal. Films of the two emulsions are cast on a smooth surface to an even thickness of ten mils. The films are allowed to dry and harden at room temperature for at least three days. The dried films have a thickness of about 5 mils. For the comparative test, a drop of water is placed on each film simultaneously, and the time required for the clear film to start to whiten, i. e. turn white, under the drop of water is noted. Whitening of the film indicates that it has started to re-emulsify, and the time required for whitening to start is inversely proportional to the water sensitivity of the film.

With test films made from the emulsion described in this example above, it was found that film from the unmodified portion of the emulsion whitened at once under a drop of water, while a film made from the modified part of the emulsion i. e. the part containing glyoxal, remained clear for about 60 seconds under a drop of water.

*Example 2*

As another example of this invention, an aqueous polyvinyl acetate emulsion was prepared using the same proportion of ingredients as described in the previous example, but the whole emulsion was allowed to cool to room temperature without the addition of glyoxal. Then one sample of the emulsion was modified by the addition of 2% by weight of a 30% aqueous solution of glyoxal, added to the sample at room temperature, and a second sample of the emulsion was modified by heating it to a temperature of 45° C. then adding 2% by weight of a 30% aqueous solution of glyoxal while the sample was at the elevated temperature.

The simple spot test described in the preceding example was carried out on films cast from the unmodified emulsion of Example 2 and from the two samples modified by the addition of glyoxal. The film from the unmodified emulsion whitened at once under a drop of water, and the film from the sample containing glyoxal added at room temperature also whitened immediately under a drop of water. In contrast, the film from the sample containing glyoxal added while the emulsion was at a temperature of 45° C. remained clear for about 60 seconds, indicating much lower water sensitivity.

Another test which can be used to assess the water resistance of a polyvinyl acetate film is the "Washability Test for Emulsion Paints," Method 614.2 of U. S. Federal specification TT–P–141b. This test is performed using a Gardner straight-line scrubber to rub a weighted brush back and forth across a paint film or coating wetted with mild aqueous soap solution. The number of cycles (back-and-forth brush strokes), required to wear through the film is a criterion of the film's strength. With polyvinyl acetate films, which are softened and thus weakened by water, the test can also be used as a relative measure of water resistance. Films which have greater water resistance than others will require more cycles to wear through the film in the "Washability Test," while less water-resistant films will be softened by the soap solution and will wear through with a smaller number of cycles.

Samples of the two parts of the emulsion prepared in Example 1 (one part containing no glyoxal and one part being modified by addition of glyoxal), were plasticized with 5%, 15%, or 25%, by weight of the polyvinyl acetate, of dibutyl phthalate. Films were cast from these plasticized emulsions and dried for testing by the above described "Washability Test" method. The following table gives the results of the test, the figures indicating the number of cycles made in wearing out the film.

| Emulsion | Percent Plasticizer | Washability Test Result |
|---|---|---|
| Unmodified Emulsion | 5 | Worn at 750 cycles. |
| Emulsion and Glyoxal | 5 | Still good after 2,700 cycles. |
| Unmodified Emulsion | 15 | Worn at 1,120 cycles. |
| Emulsion and Glyoxal | 15 | Still good after 3,200 cycles. |
| Unmodified Emulsion | 25 | Worn at 1,000 cycles. |
| Emulsion and Glyoxal | 25 | Worn at 2,500 cycles. |

From the foregoing table it can be seen that over a wide range of plasticizer contents, the films are all more wear and water resistant if they contain glyoxal.

The polyvinyl acetate emulsions to which this invention applies are those emulsions which are made by polymerizing emulsified vinyl acetate in aqueous medium with hydroxyethyl cellulose as the principal stabilizer. The emulsions usually contain between 2% and 6% by weight of the vinyl acetate, of hydroxyethyl cellulose stabilizer, and the completed emulsion usually contains between about 30% and 60% by weight of solids. The higher proportions of glyoxal in the operable range of this invention are preferably used in conjunction with emulsion containing the higher proportions of stabilizer.

What is claimed is:

1. A method which comprises adding to an emulsion polymerized polyvinyl acetate emulsion containing hydroxyethyl cellulose as the principal stabilizer, a quantity of glyoxal between 0.3 and 3% by weight of the polyvinyl acetate, while the emulsion is at an elevated temperature above about 40° C. and not greater than about 90° C.

2. A method as in claim 1 in which the emulsion is heated from room temperature to the elevated temperature.

3. A method as in claim 1 in which the elevated temperature is between 45° C. and 60° C.

4. A method as in claim 2 in which the elevated temperature is between 45° C. and 60° C.

5. A method as in claim 3 in which the glyoxal is added to the emulsion after polymerization has been completed at elevated polymerization temperature above 45° C. and before the emulsion has cooled below 45° C.

6. A method as claimed in claim 5, including adding acetic acid to the emulsion to lower its pH to a value not lower than 2.

7. A method as claimed in claim 6, wherein the pH of the emulsion is lowered to a value between 2.5 and 3.5.

8. An aqueous emulsion polymerized polyvinyl acetate emulsion containing hydroxyethyl cellulose as the principal stabilizer and glyoxal, in an amount between 0.3% and 3% by weight of the polyvinyl acetate, which has been added to the emulsion while the emulsion is at a temperature above about 40° C. and not greater than about 90° C.

9. A process for improving the properties of a polyvinyl acetate emulsion containing hydroxyethyl cellulose as the principal stabilizer, to render the emulsion capable of forming dried films having highly improved water resistance, comprising heating the emulsion to an elevated temperature between 45° C. and 60° C. then adding glyoxal to the emulsion in an amount between 0.3 and 3% by weight of the polyvinyl acetate while the emulsion is at the elevated temperature.

References Cited in the file of this patent

UNITED STATES PATENTS

| | | |
|---|---|---|
| 2,628,948 | Kunze et al. | Feb. 17, 1953 |
| 2,662,863 | Bristol et al. | Dec. 15, 1953 |
| 2,662,866 | Bristol et al. | Dec. 15, 1953 |
| 2,715,584 | Horback et al. | Aug. 16, 1955 |